United States Patent [19]

Wada et al.

[11] 4,327,697
[45] May 4, 1982

[54] HEATER FOR AIR-FUEL MIXTURE HAVING HEATING ELEMENT OF POSITIVE TEMPERATURE COEFFICIENT RESISTOR

[75] Inventors: Shigetaka Wada, Kuwana; Toshio Yamada, Nagoya, both of Japan

[73] Assignee: NGK Insulators, Ltd., Nagoya, Japan

[21] Appl. No.: 144,838

[22] Filed: Apr. 29, 1980

[30] Foreign Application Priority Data

Mar. 27, 1980 [JP] Japan ............... 55/39468[U]

[51] Int. Cl.³ ................. F02M 31/12; F02M 53/00
[52] U.S. Cl. ..................... 123/549; 219/207; 219/376; 219/382; 261/142
[58] Field of Search ............ 123/549; 261/142; 219/207, 206, 376, 382

[56] References Cited

U.S. PATENT DOCUMENTS

| | | | |
|---|---|---|---|
| 2,668,900 | 2/1954 | Kwartz | 219/207 X |
| 2,700,722 | 1/1955 | Gurley | 219/207 X |
| 3,892,215 | 7/1975 | Hickling et al. | 123/549 |
| 3,987,772 | 10/1976 | McBride, Jr. | 123/549 |
| 4,108,125 | 8/1978 | Marcouy et al. | 123/549 |
| 4,108,953 | 8/1978 | Rocco | 261/142 |

FOREIGN PATENT DOCUMENTS

| | | | |
|---|---|---|---|
| 54-75637 | 6/1979 | Japan | 123/549 |
| 55-37526 | 3/1980 | Japan | 123/549 |
| 55-72647 | 5/1980 | Japan | 123/549 |
| 55-151151 | 11/1980 | Japan | 123/549 |

Primary Examiner—Wendell E. Burns
Attorney, Agent, or Firm—Stevens, Davis, Miller & Mosher

[57] ABSTRACT

A heater for an air-fuel mixture having a heating element of a positive temperature coefficient resistor comprises a pair of metallic thin cylinders of different sizes each having outward flange portions at least at one end combined with each other as a double cylinder; a plurality of positive temperature coefficient resistors arranged between said inner and outer cylinders with springs for pressing the positive temperature coefficient resistors to the inner cylinder wall; an electric insulator plate inserted between the outward flange portions of said inner cylinder and the outward flange portions of said outer cylinder; a fixing means anchoring between said outward flange portion of the outer cylinder and said outward flange portion of the inner cylinder for fixing integrally with electric insulator plate; an electrically insulating material inserted between an inner end portion of the inner cylinder and an inner end portion of the outer cylinder for spacing between said inner end portion of the inner cylinder and said inner end portion of the outer cylinder with end gaps so as to insulate said inner end portions of said inner cylinder and outer cylinder. The engine with this heater can easily start and requires no fuel-rich mixture even in cold weather. As a result, an exhaust amount of carbon monoxide and hydrocarbon in exhaust gas can be remarkably reduced and an engine having excellent acceleration ability immediately after starting can be obtained.

25 Claims, 14 Drawing Figures

FIG_1

FIG_2

FIG_3

HEATER FOR AIR-FUEL MIXTURE HAVING HEATING ELEMENT OF POSITIVE TEMPERATURE COEFFICIENT RESISTOR

BACKGROUND OF THE INVENTION

The present invention relates to a heater having a positive temperature coefficient resistor as a heating element, particularly relates to a heater for an air-fuel mixture for improving starting and operating performances of engines by heating an air-fuel mixture susceptible to internal combustion engine and promoting evaporation of fuel.

Hitherto, it has been proposed to improve an ignition and combustion of an air-fuel mixture in the internal combustion engine so as to stabilize the operation thereof by heating an air-fuel mixture supplied to the internal combustion engine and promoting evaporation of fuel. As heaters, therefore, there has been known such one that is made by arranging a honeycomb-like positive temperature coefficient resistor between a carburetter and an intake manifold as known in U.S. Pat. No. 4,108,125, or such one that is made by arranging a heater fitted a cylindrical positive temperature coefficient resistor coated with electrode layers on inner and outer surfaces thereof within a ceramic cylinder in an intake manifold as known in Japanese Patent Laid-open No. 75,637/79, or such one that is made by arranging a heater provided with a plate-like positive temperature coefficient resistor housed in the container and secured to a heat dissipating cover on the wall of an intake manifold just under a carburetor, as known in U.S. Pat. No. 3,987,772.

The heater composed of a honeycomb-like positive temperature coefficient resistor, however, is susceptible to mechanical shocks and thermal shocks, since their positive temperature coefficient resistor is directly contacted with the air-fuel mixture, so that the electrode of said positive temperature coefficient resistor becomes to be corroded by fuel ingredient or moisture contained in the air-fuel mixture, and the positive temperature coefficient resistor is reduced. As a result, even if the electric insulating coating is applied on the surface of said positive temperature coefficient resistor, the heat transmission property from said positive temperature coefficient resistor to the air-fuel mixture is not only deteriorated, but also the swelling or peeling of coating material is caused, and the heater cannot withstand the use for a long period.

Moreover, in the heater arranged in the cylindrical positive temperature coefficient resistor and the ceramic cylindrical body, the breakdown is caused by thermal stress generated by a thermal expansion difference between both the bodies, the dimensional precision is required in fitting, and the wall surface in the intake manifold should mechanically be worked because of arrangement in the intake manifold. Thus, this heater is economically disadvantageous. In addition, the heater made by housing the positive temperature coefficient resistor secured with the heat dissipating cover in the container is arranged in the wall of the intake manifold just under the carburetor. However, said intake manifold is provided with a fluid passage for heating the air-fuel mixture by the exhaust gas or for cooling the internal combustion engine by cooling water, so that the position for securing the heater is limited and the intake manifold becomes complicated in design, and as a result, this heater becomes expensive in construction and poor in practice.

This invention is made for eliminating the above drawbacks of a heater for heating an air-fuel mixture with the use of these conventional positive temperature coefficient resistors as a heating element.

SUMMARY OF THE INVENTION

An object of the present invention is to provide a heater for an air-fuel mixture having a heating element of a positive temperature coefficient resistor comprises;

a pair of metallic thin cylinders of different sizes each having outward flange portions at least at one end combined with each other as a double cylinder;

a plurality of positive temperature coefficient resistors arranged between said inner and outer cylinders with springs for pressing the positive temperature coefficient resistors to the outside wall of the inner cylinder;

an electric insulator plate inserted between the outward flange portions of said inner cylinder and the outward flange portions of said outer cylinder for insulating both outward flange portions;

a fixing means anchoring between said outward flange portion of the outer cylinder and said outward flange portion of the inner cylinder for fixing integrally with electric insulator plate;

an electrically insulating material inserted between an inner end portion of the inner cylinder and an inner end portion of the outer cylinder for spacing between said inner end portion of the inner cylinder and said inner end portion of the outer cylinder with end gaps so as to insulate both inner free end portions thereof.

BRIEF DESCRIPTION OF THE DRAWING

The invention will be explained with reference to the accompanying drawings, in which.

PREFERRED EMBODIMENT OF THE INVENTION

An embodiment of the invention will be explained with reference to the drawings in more detail.

Figure 1:
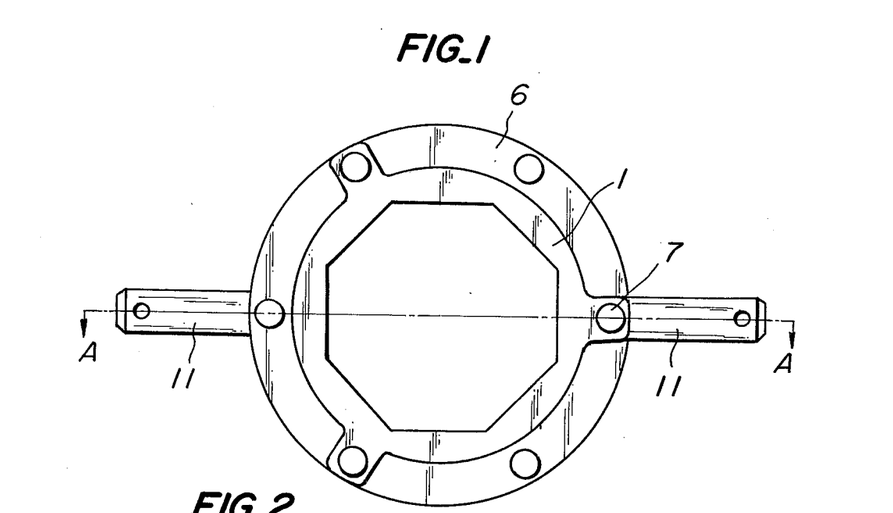
FIG. 1 is a plan view showing one embodiment of a heater according to the invention.
Figure 2:
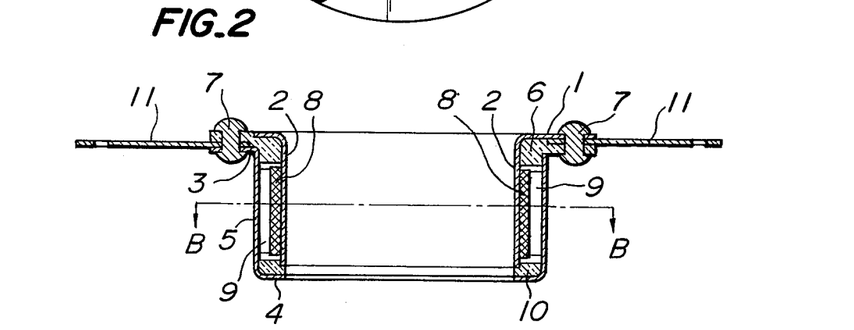
FIG. 2 is a cross-sectional view on the line A—A of FIG. 1.
Figure 3:
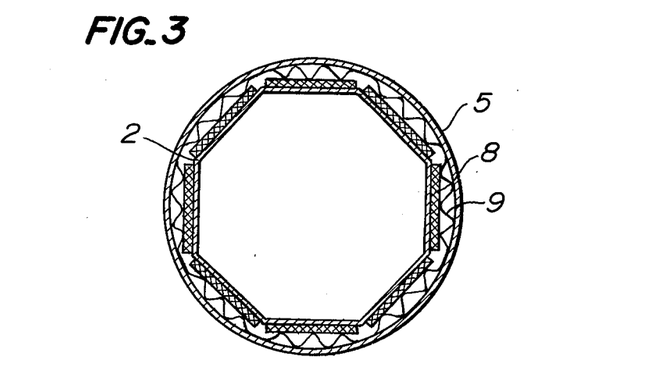
FIG. 3 is a cross-sectional view on the line B—B of FIG. 2.

As shown in FIGS. 1, 2 and 3, a thin metallic inner cylinder 2 having an outward flange 1 at one end is molded by drawing or impact working, and a thin metallic outer cylinder 5 having a different size of an outward flange 3 larger than that of the inner cylinder, formed at one end and an inward flange 4 at the other end is molded by drawing or impact working. These cylinders 2 and 5 are composed into a double cylinder, an electric insulator plate 6 is sandwiched between the outward flange 1 of the inner cylinder 2 and the outward flange 3 of the outer cylinder 5 and the outward flanges 1 and 3 of both the cylinders 2 and 5 are anchored by a rivet 7 of fixing means.

A gap formed by a pair of free end portions of the cylinders 2 and 5 is provided with a plurality of positive temperature coefficient resistors 8 and springs 9 in such arrangement that the positive temperature coefficient resistors 8 are on the side of the inner cylinder and the springs 9 are on the side of the outer cylinder so as to contact said resistors with the wall of the inner cylinder.

A gap formed on the other end portion of the double cylinder is electrically insulated and sealed by an electrically insulating material 10.

Terminals 11 for power supply to the positive temperature coefficient resistors 8 are secured to the electric insulator plate 6 together with the outward flange 1 of the inner cylinder, and the outward flange 3 of the outer cylinder by the rivet 7.

The heater according to the invention is for heating an air-fuel mixture mainly to be supplied to an internal combustion engine and for promoting evaporation therefor, so that it is necessary to rapidly raise a temperature in the inner cylinder after starting of power supply. Therefore, it is necessary to make the inner cylinder 2 well in thermal conductivity and small in heat capacity.

Moreover, it is also necessary to susceptibly change an amount of heating of the positive temperature coefficient resistor 8 in response to the amount of air and fuel flowed onto the inner surface of the inner cylinder 2, so that it is important to make the wall thickness of the inner cylinder 2 thin and the heat capacity small. In order to rapidly raise a temperature of the inner cylinder 2, it is effective to make a heat capacity of the outer cylinder 5 small, so that it is effective to make the wall of the outer cylinder 5 thin.

Furthermore, it is one of most important conditions that parts of the internal combustion engine are light in weight, so that it is effective to make the wall thickness of the inner and outer cylinders 2 and 5 thin.

Thus, due to the request in view of the performance of the present heater, thin walls of the inner cylinder 2 and the outer cylinder 5 are required, and hence it is preferable to make the cylinders with metal having a thickness of not more than 2 mm, preferably not more than 1 mm, and more preferably not more than 0.5 mm, shaped by pressing in a broad sense, particularly drawing or impact working by pressing a thin metal plate with a metal mold and forming it into a cylinder with a flange.

As material of the inner cylinder 2 and the outer cylinder 5, use may be made of aluminum, aluminum alloy, copper, copper alloy, zinc, zinc alloy, stainless steel and the like. Particularly, as the inner cylinder, light and thermally conductive aluminum is preferable, while as the outer cylinder, mechanically strong stainless steel is preferable.

In order to efficiently transmit the heat of the positive temperature coefficient resistor 8 to the inner cylinder 2, the inner cylinder 2 is thermally sufficiently contacted with the positive temperature coefficient resistor 8. The inner cylinder 2 made of metal can comparatively freely and precisely be plastic worked or machined in its configuration.

On the other hand, the positive temperature coefficient resistor such as barium titanate or the like of a semiconductor is ceramic material having a high brittleness, so that it is difficult to manufacture the resistor with a high precision such as metal. That is, it is difficult to integrally manufacture the positive temperature coefficient resistor 8 with the inner cylinder for thermally sufficiently contacting them with each other, and it is also difficult to manufacture the resistor into a curved plate. Moreover, the positive temperature coefficient resistor 8 is a kind of semiconductors, so that it is difficult to manufacture the positive temperature coefficient resistor having a predetermined resistance value under the condition of less variations of resistance values.

Therefore, the outer peripheral wall surface of the inner cylinder 2 is preferably made into a polygon formed by connecting a plurality of planes.

A number of the positive temperature coefficient resistors 8 secured to the planes are plural, at least not less than four, preferably not less than six, and more preferably not less than eight, and based on such combination, variations of the resistance values can be minimized, and as a result, it becomes easy to manufacture a flat plate in thermally close contact with the inner cylinder.

A surface area and shape of the flat surface of the positive temperature coefficient resistor are selected in accordance with the object. A thickness of the flat plate of the positive temperature coefficient resistor is such one that it can withstand a voltage used and has a mechanical strength necessary in case of assembling into a double cylinder, so that in relation to the surface area, the thickness may be 0.5 to 2 mm, preferably not more than 1.5 mm for the purpose of making a thermal resistance in the positive temperature coefficient resistor small, and more preferably not more than 1 mm.

An amount of heat of the positive temperature coefficient resistor is generally large when a temperature of rapidly increasing resistance, i.e., Curie temperature, is high.

However, when the heater according to the invention is aimed at evaporation of gasoline such as an internal combustion engine, it is effective to make an inner surface temperature of the inner cylinder constant, at least not less than 80° C. Therefore, the Curie temperature of the positive temperature coefficient resistor may be not less than 120° C., preferably not less than 150° C. On the contrary, if the Curie temperature of the positive temperature coefficient resistor is too high, not only the inner surface temperature of the inner cylinder becomes unnecessarily high, but also the expensive material having a high heat resistance must be used as an electric insulator plate, so that the Curie temperature of the positive temperature coefficient resistor may be not more than 230° C., and preferably not more than 210° C.

In addition, in order to make a thermal contacting property of the inner cylinder 2 and the flat plate of the positive temperature coefficient resistor 8 well, it is effective to interpose a thermally conductive and heat transmissible grease or paste on the contact surface of both the inner cylinder and the resistor.

Figure 4:
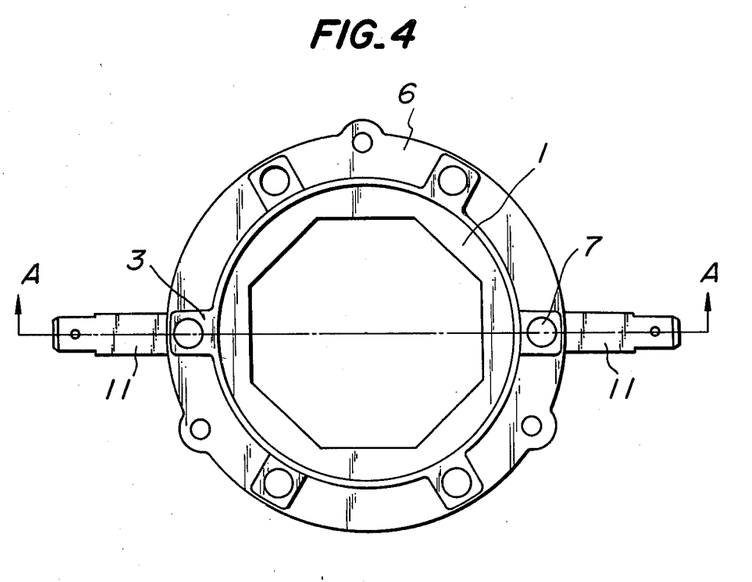
FIG. 4 is a lower view showing another embodiment of the heater according to the invention.
Figure 5:
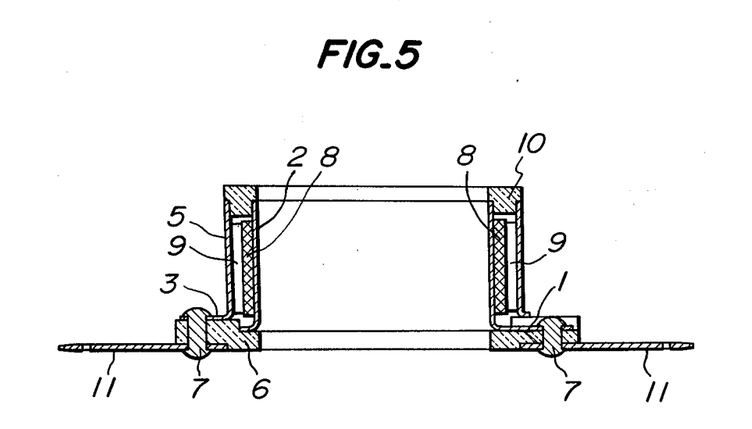
FIG. 5 is a cross-sectional view on the line A—A of FIG. 4.

The outward flange 1 of the inner cylinder 2 and the outward flange 3 of the outer cylinder 5 are not necessarily the same width around the whole periphery, but as shown in FIGS. 1 and 2, it is preferable to anchor the inner cylinder 2 and the outer cylinder 5 to the electric insulator plate 6 at the flange 3 of the outer cylinder 5 by sandwiching said electric insulator plate 6 with the both outward flanges 1 and 3. As a construction for anchoring the outward flange 1 of the inner cylinder 2 and the outward flange 3 of the outer cylinder 5 to the electric insulator plate 6, as shown in FIGS. 1 and 2, the electric insulator plate 6 is positioned in the middle of the flange 1 of the inner cylinder 2 and the flange 3 of the outer cylinder 5, but as shown in FIGS. 4 and 5, it is preferable to anchor any one of flanges of the terminal plate 11 with the electric insulator plate 6 by means of the rivet 7, so as to insulate between the outward flange of the outer cylinder and the outward flange of the inner cylinder. In addition, the means for anchoring the flanges 1, 3 to the electric insulator plate 6 is not limited to the rivet as shown in FIGS. 1, 2, 4 and 5, but any means such as bolts and nuts can be used.

Figure 6:
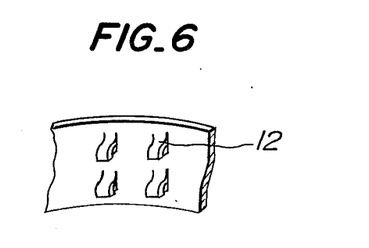
FIG. 6 is a perspective view showing one embodiment of a spring.

The spring 9 for pressing the flat plate of the positive temperature coefficient resistor to the outer wall of the inner cylinder is not limited to the corrugated form as shown in FIG. 3, but use may be made of nail-like protrusions 12 or the like, that is, any shape which can perform by pressing the positive temperature coefficient resistor to the outer wall of the inner cylinder is available. In addition, an integrally connected spring 9 is easy for assembling, but it may be divided into two or more than two. As material for the spring 9, use may be made of phosphor bronze, spring steel, stainless steel, Ti-Cu alloy or the like, which is commonly known as spring material.

Figure 7:
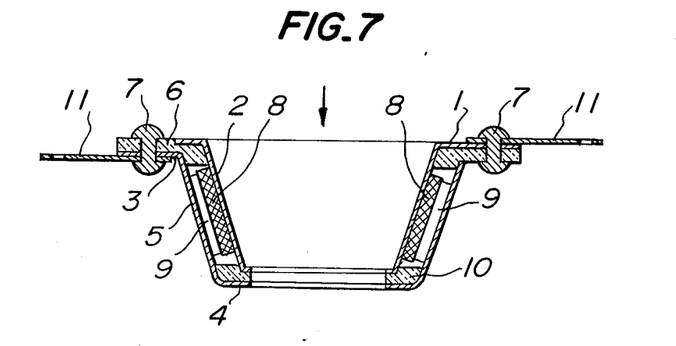
FIG. 7 is a cross-sectional view showing a further embodiment of the heater according to the invention.

Besides, in order to make a thermal contact of an air-fuel mixture with the inner wall surface of the inner cylinder well, as shown in FIG. 7, the size of an inlet opening is made larger than the size of the outlet opening, as shown in FIG. 7.

Figure 8:
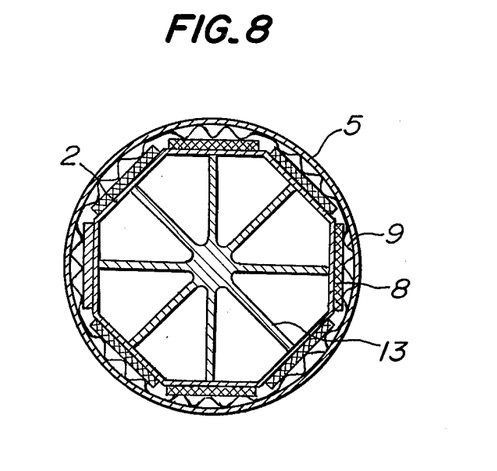
FIG. 8 is a cross-sectional view showing a still further embodiment of the heater according to the invention.

Moreover, in order to make heat dissipation from the inner surface of the inner cylinder 2 well, for instance, in an embodiment as shown in FIG. 8, it is effective to secure a dissipater 13 thermally coupled to the inner cylinder in the inside of the inner cylinder 2.

Figure 9:
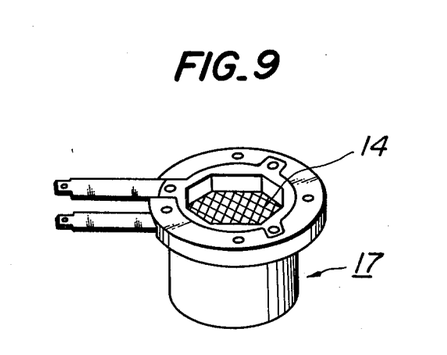
FIGS. 9 and 10 are perspective views showing another embodiments of the heater according to the invention, respectively.
Figure 10:
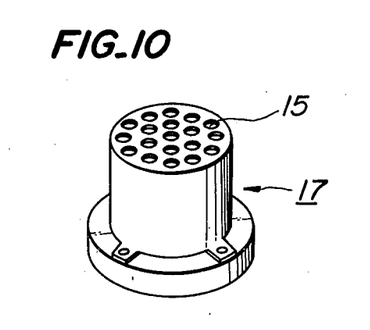

Furthermore, in order to make the mixed condition of the air-fuel mixture well, for instance, in an embodiment as shown in FIG. 9, it is also effective to secure a screen mesh member 14 for dispersing the air-fuel mixture, which is not necessarily thermally contacted to the double cylinders, to the inside of the cylinder. In addition, as shown in FIG. 10, it is effective to form a bored plate having a plurality of through holes 15 for dissipation of heat and dispersion of the air-fuel mixture in the free end portion provided with no outward flange of the inner cylinder 2 or the outer cylinder 5.

The gaps between the inner cylinder and the outer cylinder at the end anchored to the electric insulator plate with a pair of outward flanges of the double cylinder inserted between the positive temperature coefficient resistors 8 and the springs therein and at the end of the outer side are constructed to prevent the positive temperature coefficient resistors from coming out of the double cylinder by mechanical vibration and impact, and in order to prevent the positive temperature coefficient resistors from chemical deterioration caused by the air-fuel mixture entered into the double cylinder, as shown in FIGS. 1, 2, 4 and 5, the inner cylinder and the outer cylinder are electrically insulated by electric insulating material and the gaps are sealed.

Figure 11:
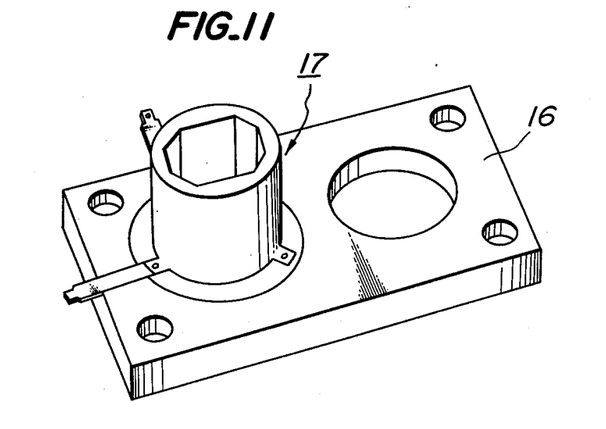
FIG. 11 is a perspective view showing the case of securing the heater according to the invention to a heat insulator.

As the electric insulator plate, use may be made of heat resisting resin such as phenol having heat resistance against a temperature when the positive temperature coefficient resistors generate heat, polybutyl terephthalate (PBT, a trade name "CELANEX" for instance), polyphenylene sulfide (PPS, a trade name "RYTON" for instance) and the like. The electric insulator plate is molded by for instance an injection molding method. The electric insulator plate, as shown in FIGS. 1 and 2, is made almost equal to the flanges of the inner cylinder and the outer cylinder, and in case of fitting it between the carburetor and the intake manifold, as shown in FIG. 11, the electric insulator plate can be mechanically secured to another heat insulator 16 or the heat insulator can coact as an electric insulator plate.

As electrically insulating material, in addition to the heat resistance against a temperature when the positive temperature coefficient resistors generate heat, it is required to provide chemical resistance for preventing from chemical corrosion by gasoline or engine oil, so that use may be made of resin such as teflon, polybutylene terephthalate (PBT, a trade name "CELANEX" for instance), polyphenylene sulfide (PPS, a trade name "RYTON" for instance) or the like, and rubber such as fluorine rubber, acryl rubber or the like.

The electrically insulating material 10, as shown in FIG. 2, is filled between the end of the inner cylinder 2 and the inner flange 4 of the outer cylinder 5, or as shown in FIGS. 4 and 5, the electrically insulating material is formed into a ring-like plug 10 for sealing the ends of the inner cylinder 2 and the outer cylinder 5. In short, it is preferable to insulate electrically and seal the gap between the inner cylinder and the outer cylinder.

EXAMPLE

A positive temperature coefficient ceramic resistor having a size of $12 \times 12 \times 1$ mm provided with electrodes on both surfaces and having a Curie temperature of 190° C. was fitted between an inner cylinder made of aluminum having a thickness of 0.5 mm and having an octagon in section and an outer cylinder made of stainless steel having a thickness of 0.5 mm, as a result, a heater having the construction shown in FIG. 1 was manufactured and connected to a power source of a direct current of 12 volt.

The current flowed from a power source terminal 11 through an outward flange of the inner cylinder 2 a positive temperature coefficient resistor 8, a spring 9 and an outer cylinder 5 to the power source terminal 11.

Figure 12:
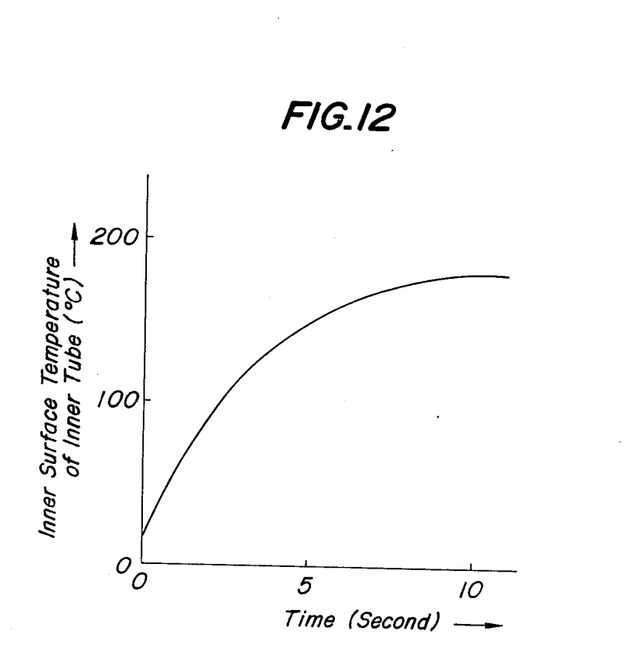
FIG. 12 is a graph showing a relation between a surface temperature of the inner surface of the inner cylinder and time after starting to transmit an electric current to the heater according to the invention.

A relation between the temperature of the inner surface of the inner cylinder and the time after starting power supply is shown in FIG. 12, that is, the temperature reached 150° C. in 5 seconds after starting.

Figure 13:
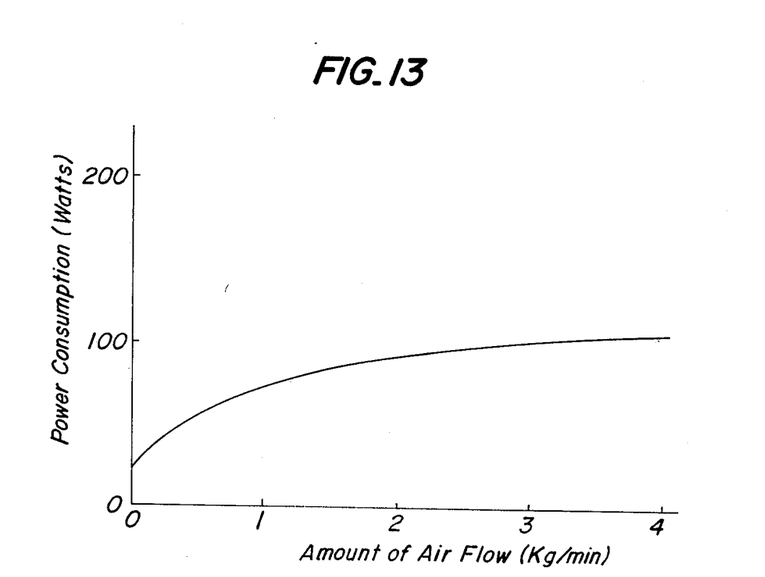
FIG. 13 is a graph showing a relation between power consumed by the heater according to the invention and an amount of air to be circulated.

A relation between an air amount and electric power consumption under the steady state when forced ventilating air into the inner surface of the cylinder is as shown in FIG. 13, that is, the electric power consumption was only 24 W in case of no air flow and a comparatively small value, such as 73 W even in case of an air flow of 1 kg/min.

Figure 14:
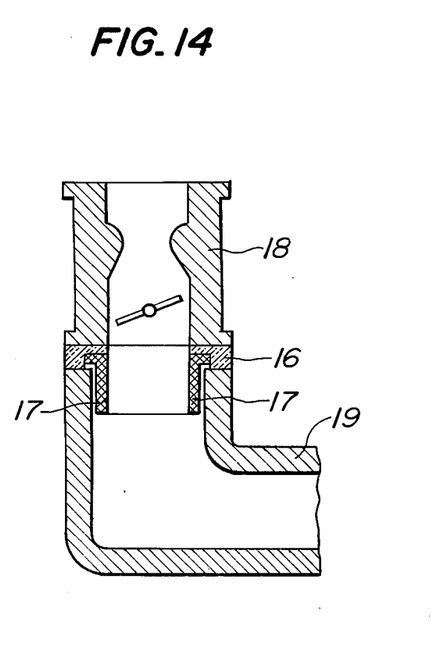
FIG. 14 is a schematic diagram of an intake manifold in case of mounting the heater according to the invention on the engine.

This heater 17 with a heat insulator 16 was fitted in the middle of a carburetor 18 and an intake manifold 19 of a 1.6 liter 4-cylinder engine available on the market as shown in FIG. 14.

When a mixture of gasoline and air was flowed at the rate of 1 kg/min of air, a number of rotations of the engine in this case were 1600 RPM, and a heat generating amount of the heater at the running condition of 18 horsepower was 310 W. A difference 237 W between 310 W in case of the air-fuel mixture flow and 73 W in case of an air flow only was considered as energy converted into energy for heating and evaporating gasoline, and an effective energy efficiency was about 76%.

As stated in the foregoing, the heater according to the invention uses the positive temperature coefficient resistor as a heating element, so that a heat generating amount is hardly changed even if a voltage is changed, the heat generating amount is increased or decreased in accordance with a flow amount of the air-fuel mixture, and even if the air-fuel mixture is not flowed, the heater is never overheated. The positive temperature coefficient resistor is provided in a double cylinder having a thin thickness formed by drawing or impact working, so that the positive temperature coefficient resistor is never chemically corroded by gasoline or engine oil, the heater is rapidly heated to a certain temperature, and outward flanges are provided at respective ends of the inner cylinder and the outer cylinder so as to integrally construct the electric insulator plate with the cylinders at the flanges. As a result, the heater is compact, light in weight and easily detachable between the carburetter and the intake manifold.

The engine with this heater can easily start even in cold weather, requires no fuel-rich mixture even in cold weather, and as a result, it becomes possible to provide an engine system having less fuel consumption. In addition, as no fuel-rich mixture is required, an emission of carbon monoxide and hydrocarbon in exhaust gas can be reduced, an engine having excellent acceleration ability immediately after starting can be obtained, and the invention greatly contributes to development of this field of industry.

What is claimed is:

1. A heater for an air-fuel mixture having a heating element of a positive temperature coefficient resistor comprising;
    a pair of metallic thin cylinders of different sizes each having outward flange portions at least at one end combined with each other as a double cylinder provided with an inner cylinder and an outer cylinder;
    a plurality of positive temperature coefficient resistors arranged between said inner and outer cylinders with springs for pressing the positive temperature coefficient resistors to the inner cylinder wall;
    an electric insulator plate inserted between the outward flange portions of said inner cylinder and the outward flange portions of said outer cylinder;
    a fixing means anchoring between said outward flange portion of the outer cylinder and said outward flange portion of the inner cylinder for fixing integrally with electric insulator plate;
    an electrically insulating material inserted between an inner end portion of the inner cylinder and an inner end portion of the outer cylinder for spacing between said inner end portion of the inner cylinder and said inner end portion of the outer cylinder with end gaps so as to insulate said inner end portions of said inner cylinder and outer cylinder.

2. A heater for an air-fuel mixture is claimed in claim 1, wherein the metallic thin cylinder is press worked.

3. A heater for an air-fuel mixture as claimed in claim 2, wherein the press-worked metallic thin cylinder has a thickness of not more than 2 mm.

4. A heater for an air-fuel mixture as claimed in claim 3, wherein the thickness of the metallic thin cylinder is not more than 0.5 mm.

5. A heater for an air-fuel mixture as claimed in claim 1, wherein the inner cylinder is made of aluminum and the outer cylinder is made of stainless steel.

6. A heater for an air-fuel mixture as claimed in claim 1, wherein the outer peripheral wall surface of the inner cylinder is a polygon provided with a plurality of planes.

7. A heater for an air-fuel mixture as claimed in claim 1, wherein the plurality of positive temperature coefficient resistors are semiconductive barium titanate series ceramics.

8. A heater for an air-fuel mixture as claimed in claim 7, wherein the positive temperature coefficient resistors are not less than four.

9. A heater for an air-fuel mixture as claimed in claim 8, wherein the positive temperature coefficient resistors are more than eight.

10. A heater for an air-fuel mixture as claimed in claim 7, wherein the positive temperature coefficient resistors are plate-shaped and provided with electrodes on both surfaces.

11. A heater for an air-fuel mixture as claimed in claim 10, wherein a thickness of the positive temperature coefficient resistor is 0.5 to 2 mm.

12. A heater for an air-fuel mixture as claimed in claim 11, wherein the thickness of the positive temperature coefficient resistor is 0.5 to 1 mm.

13. A heater for an air-fuel mixture as claimed in claim 1, wherein an electroconductive and heat-conductive material is interposed between the inner cylinder and the positive temperature coefficient resistor.

14. A heater for an air-fuel mixture as claimed in claim 1, wherein a pair of flanges are anchored to one surface of the electric insulator plate.

15. A heater for an air-fuel mixture as claimed in claim 1, wherein an inlet opening of the inner cylinder for the air-fuel mixture is made larger than an outlet opening thereof.

16. A heater for an air-fuel mixture as claimed in claim 1, wherein a dissipater thermally coupled to the inner cylinder is provided in the inside of the inner cylinder.

17. A heater for an air-fuel mixture as claimed in claim 1, wherein a screen mesh member for dispersing the air-fuel mixture is provided in the free end of the inner or outer cylinder.

18. A heater for an air-fuel mixture as claimed in claim 1, wherein the free end surface having no outward flanges of the outer cylinder or the inner cylinder are provided with a plate having a plurality of through holes for heat dissipation and air-fuel mixture dispersion.

19. A heater for an air-fuel mixture as claimed in claim 1, wherein the air-fuel mixture consists of air and gasoline.

20. A heater for an air-fuel mixture as claimed in claim 1, wherein said heater having heating element of the positive temperature coefficient resistor is provided with a heat insulator plate and said heat insulator plate is fitted between a carburetor and an intake manifold of an internal combustion engine so as to disclose said heater in the pass of the air-fuel mixture.

21. A heater for an air-fuel mixture as claimed in claim 20, wherein said heat insulator plate attached to said heater and fixed between the carburetor and the intake manifold of the internal combustion engine with said heater is an electric insulator.

22. A heater for an air-fuel mixture as claimed in claim 20, wherein the heater is fitted to the heat insulator inserted between the carburetor and the intake manifold for the internal combustion engine and disclosed in the pass of air-fuel mixture.

23. A heater for an air-fuel mixture as claimed in claim 1, wherein an inner surface temperature of the inner cylinder is not less than 80° C.

24. A heater for an air-fuel mixture as claimed in claim 1, wherein a Curie temperature of the positive temperature coefficient resistor is 120° C. to 230° C.

25. A heater for an air-fuel mixture as claimed in claim 1, wherein the Curie temperature of the positive temperature coefficient resistor is 150° C. to 210° C.

* * * * *